United States Patent
Hinokimori et al.

(10) Patent No.: US 6,653,437 B2
(45) Date of Patent: Nov. 25, 2003

(54) PROCESS FOR PRODUCING OXIDATIVE CROSS-LINKED POLYARYLENE SULFIDE

(75) Inventors: Toshio Hinokimori, Osaka (JP); Nobuhiko Yamauchi, Osaka (JP); Takayuki Mine, Nara (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 37 days.

(21) Appl. No.: 10/102,021

(22) Filed: Mar. 21, 2002

(65) Prior Publication Data

US 2002/0193558 A1 Dec. 19, 2002

(30) Foreign Application Priority Data

Mar. 27, 2001 (JP) .................................... P2001-089932

(51) Int. Cl.[7] .............................................. C08G 75/14
(52) U.S. Cl. ....................... 528/388; 528/373; 525/537; 525/535
(58) Field of Search ................. 528/388, 373; 525/537, 535

(56) References Cited

U.S. PATENT DOCUMENTS

| 3,793,256 A | 2/1974 | Scoggin et al. ............... 260/79 |
| 4,510,297 A | 4/1985 | Moberly ..................... 525/537 |
| 5,122,578 A | * 6/1992 | Brown et al. |
| 5,777,069 A | * 7/1998 | Tsuda et al. |

FOREIGN PATENT DOCUMENTS

| EP | 0 053 385 | 6/1982 |
| EP | 0 091 088 | 10/1983 |
| EP | 0 309 916 | 4/1989 |
| JP | 62-205127 | 9/1987 |

* cited by examiner

*Primary Examiner*—Duc Truong
(74) *Attorney, Agent, or Firm*—Armstrong, Westerman & Hattori, LLP

(57) ABSTRACT

A process for producing oxidative cross-linked polyarylene sulfide using a reaction apparatus including a reaction vessel provided with a resin inlet, a gas inlet, a resin outlet, and a gas outlet, and a transverse type heating member having a helical structure which is rotatable around a central shaft disposed in the reaction vessel. The process includes the step of supplying heated oxygen containing gas to the polyarylene sulfide from the downward direction of the transverse type heating member while the polyarylene sulfide is heated and agitated by the rotation of the transverse type heating member to carry out an oxidative cross-linking reaction of the polyarylene sulfide. According to the process, it becomes possible to increase the productivity and the gas components present in polyarylene sulfide can be effectively removed when the melt viscosity of polyarylene sulfide is increased to a desired degree after polymerizing the polyarylene sulfide.

4 Claims, 2 Drawing Sheets

PROCESS FOR PRODUCING OXIDATIVE CROSS-LINKED POLYARYLENE SULFIDE

BACKGROUND OF THE INVENTION

1. Field of the Invention

The present invention relates to processes for producing oxidative cross-linked polyarylene sulfide. More specifically, the present invention relates to a process for producing oxidative cross-linked polyarylene sulfide having an improved productivity, which enables reduction in the amount of gas generated during a melting step in an oxidative cross-linked reaction that is carried out after polymerizing polyarylene sulfide.

2. Description of Related Art

Polyarylene sulfides, a typical example of which is polyphenylene sulfide, have excellent heat resistance and chemical resistance properties and are widely used for producing molded products of electrical components, electronic parts, and automotive products as well as fibers and films.

As an example of methods for preparing polyarylene sulfide, a sulfide agent, such as sodium sulfide and sodium hydrogensulfide, is reacted with a polyhaloaromatic compound, such as p-dichlorobenzene, in an organic polar solvent, such as N-methyl-2-pyrrolidone (hereinafter also referred to as NMP). In an injection molding application, in general, crude polyarylene sulfide obtained in the above reaction is washed with water to remove salt byproducts and is then subjected to an oxidative cross-linking reaction so as to become highly viscous. In this manner, a final product having desired mechanical characteristics and mold processibilities can be obtained.

The above-mentioned oxidative cross-linking reaction of polyarylene sulfide is conventionally carried out using a batch process. For example, Japanese Unexamined Patent Application, First Publication No. Sho 62-205127 discloses a technique in which the aggregation of polyphenylene sulfide particles during an oxidative cross-linking reaction can be prevented by carrying out an oxidative cross-linking reaction of uncross-linked polyarylene sulfide in a vessel-rotation type heating device having no agitation blades.

However, although the vessel-rotation type heating device used in the method described in the above publication has an advantage, as compared with a conventional device provided with agitation blades which is used in a batch type oxidative cross-linked method, in that unnecessary shearing force is not applied to the particles of polyarylene sulfide to avoid the aggregation of the particles, and it is of great practical use, a supplying and discharging amount of oxygen containing gas used in the method cannot be increased due to problems associated with the structure of the heating device, and hence, the productivity of oxidative cross-linked polyarylene sulfide is significantly decreased. In addition to that, removal of gas components becomes insufficient, and some gas components remain in polyarylene sulfide obtained. Here, the term "gas components" means volatile substances contained in polyarylene sulfide, or components whose molecular weight is decreased due to thermal decomposition, etc. If the removal of the gas components is insufficient, corrosion of a metal mold by the gas components during a molding process, or clogging in a gas vent, i.e., a phenomenon in which tar-like substances adhere to a vent pipe during a molding process and clogs the pipe, may occur.

SUMMARY OF THE INVENTION

Accordingly, an object of the invention is to provide a method for preparing an oxidative cross-linked polyarylene sulfide resin with excellent productivity in which gas components present in polyarylene sulfide are effectively removed during an oxidative cross-linking reaction of polyarylene sulfide to be a desired melt viscosity after polymerizing polyarylene sulfide.

The inventors of the present invention, after diligent studies on solving the above object, found that not only can the oxidative cross-linking reaction of polyarylene sulfide be enhanced and the productivity thereof increased, but also that gas components present in polyarylene sulfide can be effectively removed, if a reaction apparatus including a reaction vessel and a transverse type heating member having a helical structure, which is rotatable around a central shaft disposed in the reaction vessel, is used, and heated oxygen containing gas is supplied to the polyarylene sulfide from the downward direction of the transverse type heating member via a gas inlet while the polyarylene sulfide is heated and agitated by the rotation of the transverse type heating member. Based on these findings, the inventors of the present invention completed the present invention.

Accordingly, the present invention provides a process for producing oxidative cross-linked polyarylene sulfide using a reaction apparatus including a reaction vessel provided with a resin inlet, a gas inlet, a resin outlet, and a gas outlet, and a transverse type heating member having a helical structure which is rotatable around its axis disposed in the reaction vessel, comprising the step of: supplying heated oxygen containing gas to the polyarylene sulfide from the downward direction of the transverse type heating member while the polyarylene sulfide is heated and agitated by the rotation of the transverse type heating member to carry out an oxidative cross-linking reaction of the polyarylene sulfide.

According to the above process for producing oxidative cross-linked polyarylene sulfide of the present invention, it becomes possible to increase productivity, and the gas components present in polyarylene sulfide can be effectively removed.

Hence, the oxidative cross-linked polyarylene sulfide produced by the method according to the present invention can be widely used as various molding materials or as materials for fibers, electric and electronic parts, parts for automobiles, and coating.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

Figure 1:
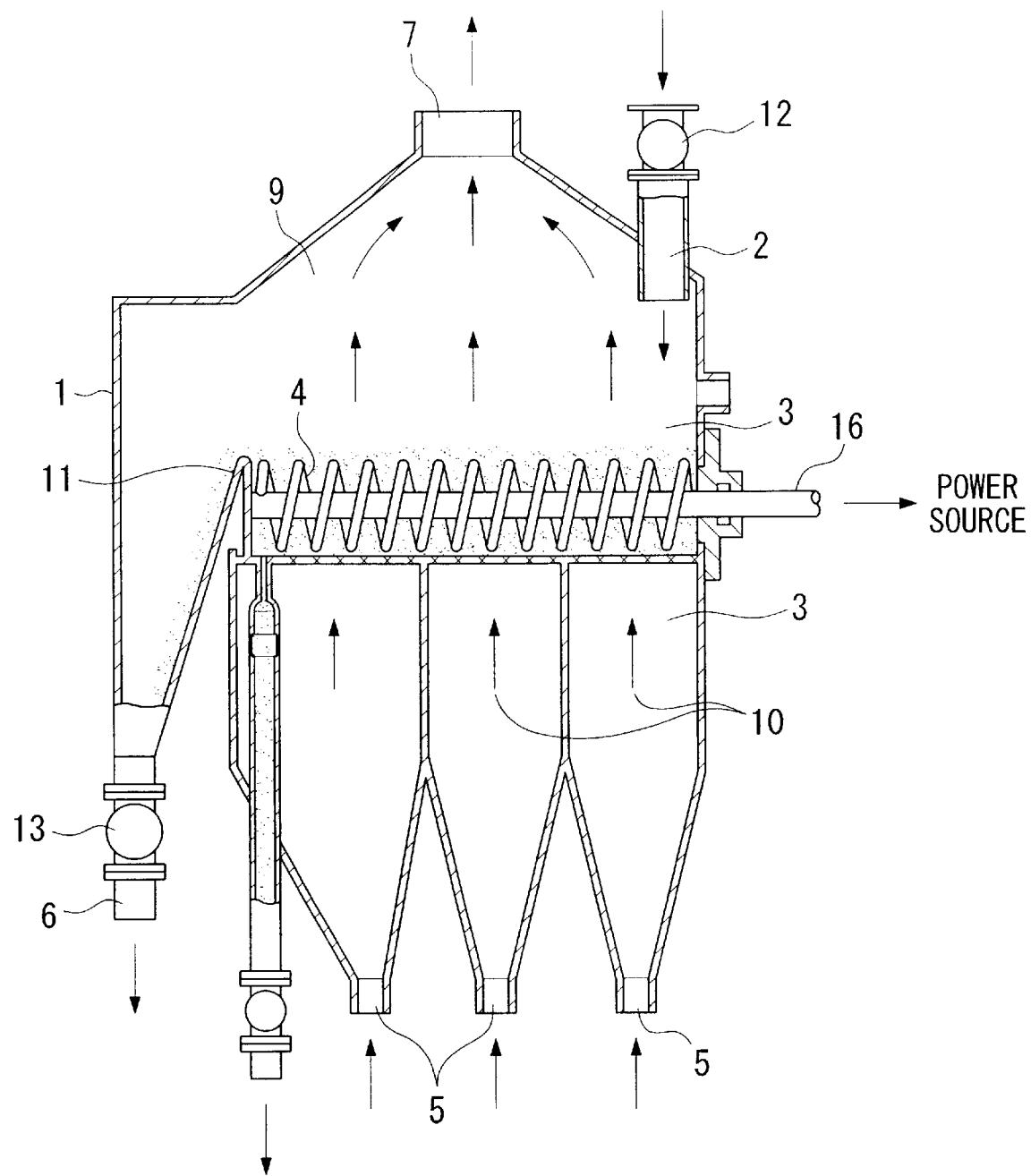
FIG. 1 is a diagram showing a cross-sectional view of a reaction apparatus used in an embodiment of the present invention viewed from the front of the apparatus.

The invention summarized above and defined by the enumerated claims may be better understood by referring to the following detailed description. This detailed description of particular preferred examples, set out below to enable one to build and use one particular implementation of the invention, is not intended to limit the enumerated claims, but to serve as a particular example thereof.

The reaction apparatus used in accordance with an embodiment of the present invention includes a reaction vessel having a resin inlet, a gas inlet, a resin outlet, and a gas outlet, and a transverse type heating member having a helical structure, which is rotatable around a central shaft disposed in the reaction vessel.

The transverse type heating member having a helical shape, which is rotatable around the central shaft disposed in the reaction vessel, applies heat to polyarylene sulfide and agitates the compound by the rotational motion around the central shaft in the reaction vessel. Also, since the transverse type heating member has its central axis in the horizontal direction, the contacting area of polyarylene sulfide with an oxygen containing gas is increased, and hence, an oxidative cross-linking reaction of the compound can be efficiently carried out.

Moreover, heated oxygen containing gas is introduced into the reaction vessel via the gas inlet for the oxidative cross-linking reaction of polyarylene sulfide. One of the characteristics of this embodiment according to the present invention is that the heated oxygen containing gas is blown into the polyarylene sulfide from the direction below the transverse type heating member. Accordingly, it is preferable that, for instance, the reaction vessel be divided into an upper compartment and a lower compartment using a partition plate having a permeable structure which is a mesh, is porous, etc., and that the above-mentioned gas outlet be provided with the upper compartment and the gas inlet be provided with the lower compartment. In such a case, the oxidative cross-linking reaction may be carried out by blowing the heated oxygen containing gas, which is introduced via the gas inlet, into the polyarylene sulfide from the lower compartment through the permeable partition plate and then discharging the oxygen containing gas via the gas outlet while heating and agitating the polyarylene sulfide using the transverse type heating member in the upper compartment.

By carrying out the oxidative cross-linking reaction of polyarylene sulfide using the above-mentioned reaction apparatus having the gas supplying and discharging means, the reaction can be performed efficiently and the effect in the removal of gas components becomes significant. Note that although the permeable partition plate has a structure of a net, is porous, etc., as mentioned above, it is preferable that such a structure be provided over the entire surface of the permeable partition plate from the viewpoint of significantly increasing the supplying and discharging amount of the oxygen containing gas as well as making uniform contact of the oxygen containing gas with polyarylene sulfide.

The position of the gas outlet is not particularly limited; however, it is preferable that the gas outlet be located at an upper portion of the reaction vessel. It is more preferable that the gas outlet be located at the upper portion of the upper compartment. In this manner, the discharge of scattered fine powder of polyarylene sulfide can be prevented in a superior manner, and the effect of removing the gas components is also improved.

In the preparation process according to an embodiment of the present invention, the oxidative cross-linking reaction of polyarylene sulfide is carried out by using the reaction apparatus explained above. Although either batch type or a continuous type production method may be employed, it is preferable to adopt the latter in order to significantly improve the productivity of oxidative cross-linked polyarylene sulfide.

Here, the term "continuous type" method means, more specifically, a method in which polyarylene sulfide is continuously supplied into the reaction vessel via the resin inlet, and oxidative cross-linked polyarylene sulfide is continuously discharged via the resin outlet while carrying out an oxidative cross-linking reaction thereof. Conventionally, no continuous type method is available in practice for the oxidative cross-linking reaction of polyarylene sulfide, and hence, it is remarkable that such a continuous method is possible by the present invention.

In order to carry out such continuous production of oxidative cross-linked polyarylene sulfide, it is preferable that an overflow weir member, which stems polyarylene sulfide agitated and pushed towards the resin outlet by the transverse type heating member, be disposed in the reaction vessel of the reaction apparatus. More specifically, it is preferable that the overflow weir member be disposed in the vicinity of the resin outlet in the above-mentioned upper compartment. Polyarylene sulfide which is subjected to the oxidative cross-linking reaction eventually overflows from the overflow weir member and is withdrawn from the resin outlet.

According to an embodiment of the present invention, it is preferable to use the apparatus shown in FIG. 1 as the above-mentioned reaction apparatus. Hereinafter the present invention will be described with reference to the reaction apparatus shown in FIG. 1.

FIG. 1 is a diagram showing a side view of the reaction apparatus. As shown in FIG. 1, the reaction apparatus includes a main body 1, a resin inlet 2, a reaction vessel 3, a transverse type heating member 4 having a helical structure which is rotatable around a central shaft, gas inlets 5, a resin outlet 6, and a gas outlet 7. Polyarylene sulfide is introduced into the reaction vessel 3 via the resin inlet 2. The reaction vessel 3 is divided into an upper compartment 9 and lower compartment 10 by a trough type permeable partition plate 8, and the transverse type heating member 4 is disposed in the upper compartment 9. The transverse type heating member 4 is coupled to a rotary shaft 16 by means of a supporting member 15, etc., and the rotary shaft 16 is rotated by a driving means, such as a motor, to rotate the transverse type heating member 4.

On the other hand, heated oxygen containing gas is continuously supplied into the reaction vessel 3 via the gas inlets 5. More specifically, the heated oxygen containing gas, which is supplied via the gas inlets 5, passes through the respective lower compartment 10 and the permeable partition plate 8, and is introduced into the upper compartment 9.

Accordingly, polyarylene sulfide introduced into the reaction vessel 3 is supported by the trough type permeable partition plate 8 and is agitated by the rotation of the transverse type heating member 4 with an appropriate shearing force. At the same time, heated oxygen containing gas, which is introduced via the respective gas inlet 5, is continuously supplied to the polyarylene sulfide through the permeable partition plate 8 so that fresh oxygen containing gas is continuously brought into contact with polyarylene sulfide.

Here, it is preferable that the lower compartment 10 be divided into a plurality of sections as shown in FIG. 1. More specifically, it is preferable that the lower compartment 10 be divided into two to five sections.

Note that the permeable partition plate 8 has a structure by which polyarylene sulfide does not drop into the lower compartment 10 from the upper compartment 9, and a gas can be introduced through at least a bottom portion thereof. The permeability of the permeable partition plate 8 can be obtained by the mesh or porous structure as mentioned above; however, it is particularly preferable to use one having the mesh structure. Also, it is preferable that a bag filter be provided with the gas outlet 7 having a function of preventing clogging of the filter by intermittent oscillation, etc.

Polyarylene sulfide introduced into the upper compartment 9 is moved towards the resin outlet 6 as it is agitated by the transverse type heating member, and it is blocked by the overflow weir member 11. Polyarylene sulfide which overflows from the overflow weir member 11 has been cross-linked to a desired viscosity, and is withdrawn from the resin outlet 6 via a rotary feeder 13.

Note that polyarylene sulfide in the upper compartment 9 is heated by the transverse type heating member 4 during the oxidative cross-linking reaction as mentioned above. It is preferable, from the viewpoint of uniformly heating polyarylene sulfide, that the transverse type heating member 4 has a tubular structure by which a heating effect is exerted by passing a heated medium through it.

Also, the reaction apparatus can be a uniaxial type having only one transverse type heating member having a helical structure, which is rotatable around the central shaft, or can be a biaxial type having two of such heating members.

Figure 2:
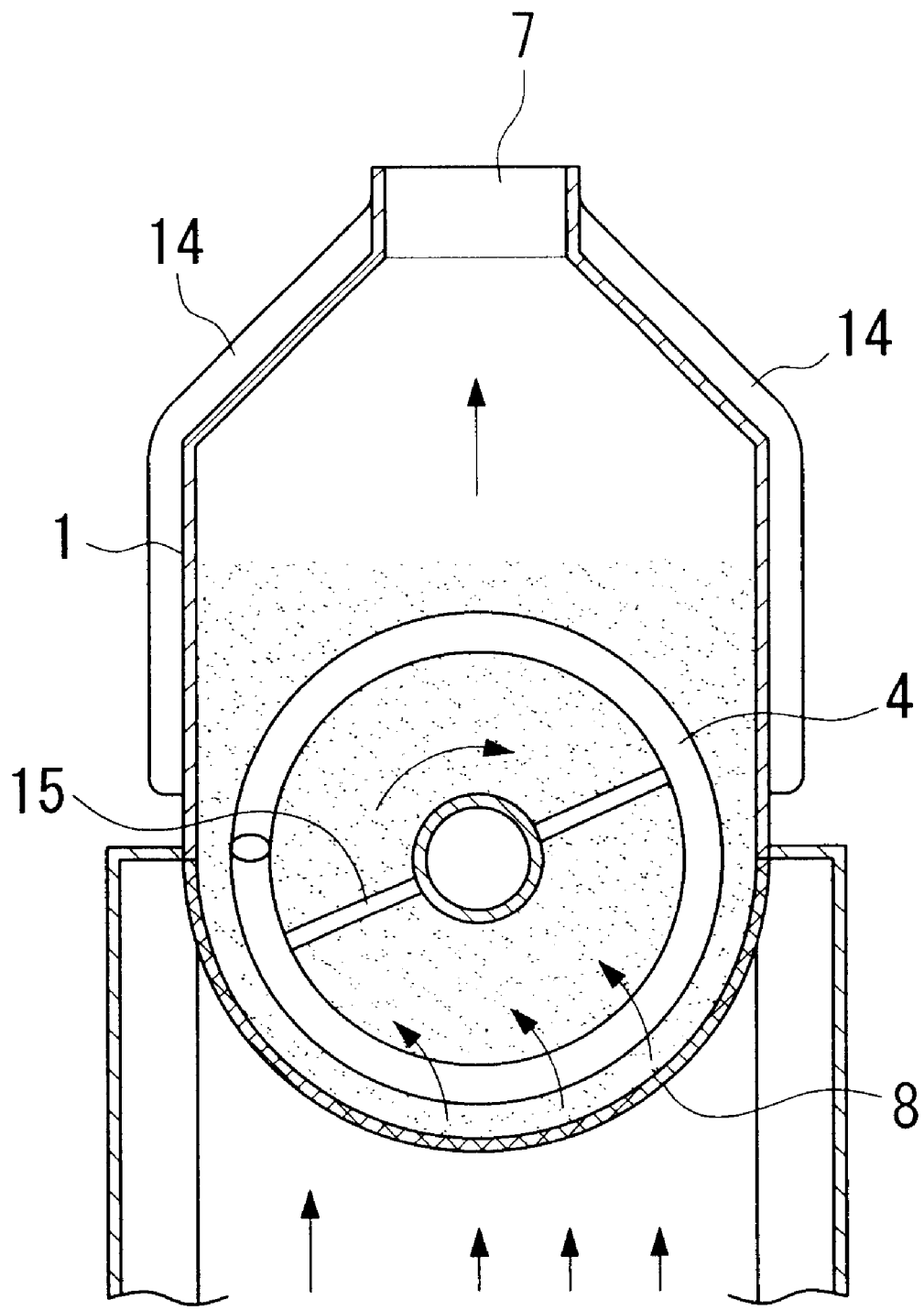
FIG. 2 is a diagram showing a cross-sectional view of the reaction apparatus shown in FIG. 1 viewed from the side of the apparatus.

The characteristics of the reaction apparatus include heating of polyarylene sulfide by the transverse type heating member 4 or the oxygen containing gas. It is preferable, from the viewpoint of maintaining a constant temperature of polyarylene sulfide, that a heating jacket 14 be provided outside the reaction vessel 3 as shown in FIG. 2.

The process for producing oxidative cross-linked polyarylene sulfide according to the embodiment of the present invention may be carried out by introducing polyarylene sulfide into the above-mentioned reaction apparatus and contacting with an oxygen containing gas in the reaction vessel while carrying out heating and agitating processes.

Here, polyarylene sulfide introduced into the reaction apparatus may be synthesized by using a known method in which a dihaloaromatic compound, such as p-dichlorobenzene, is reacted with a sulfide agent, such as sodium sulfide, potassium sulfide, and sodium hydrogensulfide. Accordingly, the polyarylene sulfide as a starting material has not been subjected to an oxidative cross-linking process. Note that in the synthesis of polyarylene sulfide, depending on its purpose, trihaloaromatic compounds, such as trichlorobenzene, or dihaloaromatic compounds having functional groups, such as dichlorobenzoic acid, and dichloroaniline may be employed together with the dihaloaromatic compound.

More specifically, a dihaloaromatic compound may be reacted with a sulfide agent in an organic solvent, such as N-methyl-2-pyrrolidone, and crude product obtained may be subjected to a solvent removing process, a washing process with water, and a washing process with hot water if necessary, to obtain powder of polyarylene sulfide. Although the obtained powder can be used as a starting material, an agglomerate powder thereof, which is obtained by compressing and pulverizing the obtained powder can be also used. In addition, it is possible to melt and mix the powder or agglomerate powder of polyarylene sulfide to be used as pellets.

It is preferable to use powder, agglomerate powder, or a mixture thereof of polyarylene sulfide from the viewpoints of maintaining an excellent thermal conductivity and increasing the contacting area with the oxygen containing gas to uniformly carry out the oxidative cross-linking reaction. Also, if only the agglomerate powder of polyarylene sulfide is used, or if the proportion of the agglomerate powder is large in the above-mentioned mixture, it becomes possible to introduce a larger amount of polyarylene sulfide into the reaction vessel to secure a longer residence time. Moreover, it becomes possible to prevent the bag filter from being clogged by scattering of powder and to prevent the yield of the products from decreasing.

In consideration of the above, it is preferable that the above agglomerate powder or the mixture of polyarylene sulfide contain 50% by weight or less, or more preferably 30% by weight or less, of that which passes through a testing sieve having 0.3 mm mesh grid in accordance with Japanese Industrial Standard (JIS) Z 8801.

Also, it is preferable that polyarylene sulfide introduced into the reaction apparatus not be subjected to an oxidative cross-linking reaction and have a melt viscosity in the range between 2 and 200 pa·s at 300° C. In such a melt viscosity range, the fluidity of polyarylene sulfide becomes appropriate after the thermal oxidative cross-linking reaction.

The method used for introducing polyarylene sulfide into the reaction vessel of the reaction apparatus is not particularly limited; however, a fixed quantity feeder, such as a rotary feeder and an oscillation feeder, may be suitably employed for that purpose.

Also, although the polyarylene sulfide can be directly introduced into the reaction vessel, it is preferable that the compound be preheated. In such a case, it is preferable that the heating process be carried out so that the resin temperature falls in the range between 100 and 150° C.

Polyarylene sulfide introduced in the reaction vessel in the above mentioned manner is then subjected to heating and agitating processes carried out in the upper compartment by the transverse type heating member, and at the same time, heated oxygen containing gas is supplied into the polyarylene sulfide from the downward direction of the reaction vessel for performing the cross-linking reaction. Examples of the oxygen containing gas include oxygen, air, and a mixture thereof with an inert gas, such as nitrogen gas.

More specifically, it is preferable that the heated oxygen containing gas be introduced into the reaction vessel with a rate of 10–100 L/min per kg of polyarylene sulfide. Such a rate is significantly high compared with a conventional method, yet the amount thereof is at the level suppressing the generation of a fluid state of polyarylene sulfide. As a result, the oxidative cross-linking reaction is enhanced to improve the productivity, and the loss due to scattering of polyarylene sulfide is significantly reduced. Furthermore, the effect of removing the gas components from the product is improved to significantly increase the quality of oxidative cross-linked polyarylene sulfide.

As for the temperature conditions used for the oxidative cross-linking reaction, it is preferable that the polyarylene sulfide in the reaction vessel be heated to a temperature which is 20–100° C. lower than the melting point of the polyarylene sulfide. By setting such temperature conditions, it becomes possible to prevent fusion of polyarylene sulfide powder or agglomerate, and to perform the oxidative cross-linking reaction in an excellent manner so as to significantly improve the productivity. In order to adjust the temperature for the oxidative cross-linking reaction to be within the above-mentioned range, the temperature of the oxygen containing gas introduced into the reaction vessel and/or the heating temperature of the transverse type heating member are adjusted to fall within such a temperature range. Also, the heating temperature of the transverse type heating member may be adjusted by using a tubular transverse type heating member, and adjusting the temperature of a heating medium passing through it. In addition, it is preferable to carry out a heating process by using a heating jacket which may be attached to the outside of the reaction vessel.

Also, according to the embodiment of the present invention, since a fresh oxygen containing gas is always supplied to polyarylene sulfide from the downward direction of the reaction vessel over the entire region of the reaction vessel, the force used for the agitation by the transverse type heating member can be decreased to $1/3$ to $1/5$, as compared with the case where no oxygen containing gas is supplied. Accordingly, it becomes possible to realize a uniform agitation of polyarylene sulfide in the upper compartment of the reaction apparatus without applying unnecessary shearing force thereto. Therefore, it is not necessary to excessively increase the rotation speed of the transverse type heating member, and an agitation process can be suitably carried out at a rotation speed of about 1–20 rpm.

The viscosity of polyarylene sulfide, which is heated and agitated while contacting with the heated oxygen containing gas, increases as the oxidative cross-linking reaction proceeds in the upper compartment of the reaction apparatus. The final viscosity of polyarylene sulfide may differ depending on the purpose. However, it is preferable that the melt viscosity at 300° C. falls in the range between about 20 to 40 times of that of polyarylene sulfide prior to the introduction into the reaction vessel. More specifically, it is preferable that the melt viscosity of polyarylene sulfide fall in the range between 30 and 1000 Pa·s.

Eventually, polyarylene sulfide which is subjected to the oxidative cross-linked reaction can be withdrawn from the resin outlet.

According to the present invention, a continuous oxidative cross-linking reaction of polyarylene sulfide, which has not been practically available prior to the present invention, is realized by performing the reaction in the reaction apparatus having the above-mentioned structure.

Polyarylene sulfide obtained in this manner is particularly useful in application of injection molding, and various fillers may be added in order to impart properties, such as strength, thermal resistance, and dimensional stability depending on the purpose. The types of fillers are not particularly limited, and examples thereof include fiber type fillers, inorganic fillers, etc. Examples of the fiber type fillers include, for instance, glass fiber, carbon fiber, silane glass fiber, ceramic fiber, aramid fiber, metal fiber, and fibers of potassium titanate, silicon carbide, calcium sulfite, and calcium silicate, and natural fibers, such as wallasnite. Also, examples of the inorganic fillers include, for instance, barium sulfate, calcium sulfate, clay, pyrophyllite, bentonite, sericite, zeolite, mica, isinglass, talc, atharpergyte, ferrite, calcium sulfite, calcium carbonate, magnesium carbonate, and glass beads.

Also, as an addition agent used during a molding process, a small amount of a mold releasing agent, a coloring agent, a heat resistance stabilizer, a UV stabilizer, a foaming agent, anti-corrosion agents, a flame retarder, and a lubricant may be added within the scope of the present invention.

Moreover, synthetic resins and elastomers may be used alone or in mixture according to the present invention. Examples of the synthetic resin include, for instance, polyester, polyamide, polyimide, polyetherimide, polycarbonate, polyphenylene ether, polysulfone, polyethersulfone, polyether-etherketone, polyetherketone, polyarylene, polyethylene, polypropylene, polytetrafluoroethylene, polybifluoroethylene, polystyrene, an ABS resin, an epoxy resin, a silicone resin, a phenol resin, a urethane resin, and a liquid crystal polymer. Examples of the elastomers include, for instance, polyolefin type rubber, fluororubber, and silicone rubber.

The cross-linked polyarylene sulfide obtained in accordance with the process of the present invention can be widely used, for instance, as a material for injection molding or compression molding electrical components, such as connectors, printed wiring boards, and sealing products, automotive products, such as electronic parts, lamp-reflectors, and various parts for electrical equipment, interior materials for various buildings, airplanes, and automobiles, precision parts for office automation equipment, cameras and watches, or as a material for extrusion molding or drawing molding composites, sheets, and pipes, or a material for fibers or films.

EXAMPLES

Hereinafter, the present invention will be described in detail with reference to examples and comparative examples. Note that the parts and percentages used in the following are based on mass unless otherwise so indicated.
Method for Measuring Melt Viscosity:
Melt viscosity was measured by using a flow tester under the conditions of: temperature of 300° C.; shearing velocity of 100 sec$^{-1}$; and nozzle pore size and length of 0.5 mm and 1.0 mm, respectively.
Method for Measuring the Amount of Gas Generated when Melted:
The amount of gas generated during a melting process is measured by using heat extraction gas chromatography under melting conditions of 320° C. and a column temperature of 50–290° C. The assay was carried out for all of the gas components generated. Note that the amount of gas generated was calculated by converting the measured values of standard substances.

Example 1

Polyphenylene sulfide (8.0 kg) having a melt viscosity of 18 pa·s, the content of which passed through a testing sieve having 0.3 mm mesh grid in accordance with JIS Z 8801 was 15% by weight, was introduced into the upper compartment 9 of the reaction apparatus (volume of 16L) shown in FIG. 1 via the resin inlet 2.

Then, the transverse type heating member was rotated at a speed of 7 rpm, and a heating medium at 255° C. was circulated through the transverse type heating member and through a heating jacket which was disposed at the outside surface of the heating member. The temperature of the content was increased to a temperature of 250° C. in 30 minutes while introducing air, which was preheated to a temperature of 255° C. by a heater, at a flow rate of 400 liters per minute into the reaction vessel via the gas inlet 5.

Then, after the temperature of the resin was maintained at 250° C. for five hours, polyphenylene sulfide, which was the same as the one first introduced, was continuously supplied into the upper compartment 9 for five hours at a rate of 1.6 kg/hr (i.e., the residence time was five hours). The resin discharged from the reaction apparatus was withdrawn as a sample each hour to measure the melt viscosity thereof, and as a result, one having a melt viscosity within the range of 154 to 171 Pa·s was constantly obtained. The melt viscosity of the whole polyphenylene sulfide removed was 161 Pa·s. The total amount of polyphenylene sulfide discharged during the five consecutive hours of operation was 7.8 kg. The amount of gas generated from polyphenylene sulfide when it was melted was 0.02% by weight. Results are tabulated and shown in Table 1.

Example 2

The temperature of content in the reaction apparatus was increased to 250° C. over 30 minutes using the same operation as in Example 1. After the temperature of the resin was maintained at 250° C. for one hour, polyphenylene sulfide was continuously supplied into the upper compartment 9 for five hours at a rate of 8.0 kg/hr (i.e., the residence time was one hour). The resin discharged from the reaction apparatus was withdrawn as a sample each hour to measure the melt viscosity thereof, and as a result, one having the melt viscosity within the range of 48 to 57 Pa·s was constantly obtained. The melt viscosity of the whole polyphenylene sulfide taken out was 53 Pa·s. The total amount of polyphenylene sulfide discharged during the five consecutive hours of operation was 39.2 kg. The amount of gas generated from polyphenylene sulfide when it was melted was 0.03% by weight. Results are tabulated and shown in Table 1.

Example 3

Using the same reaction apparatus as in Example 1, polyphenylene sulfide (8.0 kg), which was also the same as one used in Example 1, was introduced into the reaction apparatus, and the temperature of the content was increased to 250° C. over 30 minutes using the same operation as in Example 1. Then, after the temperature of the resin was maintained at 250° C. for five hours, the entire amount of the resin was withdrawn from the apparatus. The melt viscosity and the yield of the product was 158 Pa·s and 7.8 kg, respectively. The amount of gas generated from polyphenylene sulfide when it was melted was 0.02% by weight. Results are tabulated and shown in Table 1.

Comparative Example 1

The same polyphenylene sulfide (8.0 kg) as in Example 1 was introduced into a device disclosed in Japanese Unexamined Patent Application, First Publication No. Sho 62-205127, i.e., a vessel-rotation double cone type heating device with a volume of 30L, which was provided with a gas introduction device and a heating medium circulation type jacket. Then, the vessel was rotated at a rotation speed of 3 rpm. While air was introduced into the vessel at a flow rate of 2 liter per minute, a heating medium at 255° C. was circulated through the jacket and temperature of the content was increased to 250° C. over 6 hours. After the temperature of the resin was maintained at 250° C. for three hours, the entire amount of the resin was withdrawn from the device. The melt viscosity and the yield of the product was 160 Pa·s and 7.8 kg, respectively. The amount of gas generated from polyphenylene sulfide when it was melted was 0.12% by weight. Results are tabulated and shown in Table 1.

Comparative Example 2

The same operations as in Comparative Example 1 were performed except that the temperature of the compound was maintained at 250° C. for 30 minutes. The melt viscosity and the yield of the product was 55 Pa·s and 7.8 kg, respectively. The amount of gas generated from polyphenylene sulfide when it was melted was 0.17% by weight. Results are tabulated and shown in Table 1.

TABLE 1

|  | Ex. 1 | Ex. 2 | Ex. 3 | C. Ex. 1 | C. Ex. 2 |
| --- | --- | --- | --- | --- | --- |
| Type of device | Transverse | Transverse | Transverse | Cone | Cone |
| Volume of device (L) | 16 | 16 | 16 | 30 | 30 |
| Operation type | Continuous | Continuous | Batch | Batch | Batch |
| Quantity supplied of polyphenylene sulfide (kg/hr) | 1.6 | 8.0 | — | — | — |
| Residence time during continuous operation (hr) | 5 | 1 | — | — | — |
| Time for heating treatment (hr) | — | — | 5.5 | 9 | 6.5 |
| Production efficiency (kg/m$^3$ · h) | 98 | 490 | 89 | 29 | 40 |
| Melt viscosity of polyphenylene sulfide after heating treatment (Pa · s) | 161 | 53 | 158 | 160 | 55 |
| Amount of gas generated from polyphenylene sulfide after heat treatment (weight %) | 0.02 | 0.03 | 0.02 | 0.12 | 0.17 |

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A process for producing oxidative cross-linked polyarylene sulfide using a reaction apparatus including a reaction vessel provided with a resin inlet, a gas inlet, a resin outlet, and a gas outlet, and a transverse type heating member having a helical structure which is rotatable around its axis disposed in said reaction vessel, said process comprising the step of:

supplying heated oxygen containing gas to said polyarylene sulfide from the downward direction of said transverse type heating member while said polyarylene sulfide is heated and agitated by the rotation of said transverse type heating member to carry out an oxidative cross-linking reaction of said polyarylene sulfide.

2. A process for producing oxidative cross-linked polyarylene sulfide according to claim 1, further comprising the steps of:

continuously supplying said polyarylene sulfide into said reaction vessel via said resin inlet; and continuously withdrawing oxidative cross-linked polyarylene sulfide from said resin outlet.

3. A process for producing oxidative cross-linked polyarylene sulfide according to claim 1, wherein said reaction vessel includes a permeable partition plate member which divides said reaction vessel into an upper compartment and a lower compartment, and said gas outlet is provided with said upper compartment and said gas inlet is provided with said lower compartment, said heated oxygen containing gas is introduced via said gas inlet and is supplied to said polyarylene sulfide through said lower compartment and said permeable partition plate member while said polyarylene sulfide is heated and agitated by said transverse type heating member, and said oxygen containing gas is discharged from said gas outlet.

4. A process for producing oxidative cross-linked polyarylene sulfide according to claim 1, wherein said heated oxygen containing gas is supplied at a flow rate in a range of about 10 and 100 L/min per kg of polyarylene sulfide so as to heat said polyarylene sulfide to a temperature of about 20 to 100° C. lower than the melting point of said polyarylene sulfide.

* * * * *